United States Patent [19]

Britsch et al.

[11] Patent Number: 4,665,737
[45] Date of Patent: May 19, 1987

[54] DEVICE FOR DETECTING PRESSURE FLUCTUATIONS IN A COMBUSTION CHAMBER OF INTERNAL COMBUSTION ENGINE

[75] Inventors: Heinz Britsch, Bietigheim-Bissingen; Winfried Moser, Ludwigsburg, both of Fed. Rep. of Germany

[73] Assignee: Robert Bosch GmbH, Stuttgart, Fed. Rep. of Germany

[21] Appl. No.: 825,241

[22] Filed: Feb. 3, 1986

[30] Foreign Application Priority Data

May 25, 1985 [DE] Fed. Rep. of Germany ....... 3519028

[51] Int. Cl.$^4$ ............................................. G01L 23/22
[52] U.S. Cl. ...................................................... 73/35
[58] Field of Search .................... 73/35, 115; 123/425, 123/435

[56] References Cited

U.S. PATENT DOCUMENTS 4,307,603 12/1981 Dobler et al. ........................... 73/35
4,308,519 12/1981 Garcea et al. .......................... 73/35

Primary Examiner—Stewart J. Levy
Assistant Examiner—John E. Chapman, Jr.
Attorney, Agent, or Firm—Michael J. Striker

[57] ABSTRACT

A device for detecting pressure fluctuations in a combustion chamber of an internal combustion chamber includes two ionic current gages positioned in an end gas region of the combustion chamber and spaced from each other by a predetermined distance in an axial direction. The device detects pressure knocks in the combustion chamber by defining various time intervals for the occurrence of the ionic current during the knocking combustion and non-knocking combustion of gases in the combustion chamber.

5 Claims, 6 Drawing Figures

DEVICE FOR DETECTING PRESSURE FLUCTUATIONS IN A COMBUSTION CHAMBER OF INTERNAL COMBUSTION ENGINE

BACKGROUND OF THE INVENTION

The present invention relates to a device for detecting pressure fluctuations in a combustion chamber of an internal combustion engine by means of at least one transmitter receiving ionic current produced by ionized gases in the combustion chamber.

It has been known that pressure fluctuations in the combustion chamber of the internal combustion engine are detected by ionic current probes. It is the fact of practice that during the combustion of hydrocarbonous materials, electrically charged molecules and atoms, that is ions and free electrons occur. If a measuring voltage is applied to the arrangement with two electrodes positioned in the combustion chamber an ionic current is produced which depends upon an ion concentration. This ionic current is measured and its value is the value of the combustion process that takes place in the combustion chamber. It is known that an ionic current signal is used for detecting a knocking in the internal combustion engine. However, for detecting that knocking, complicated evaluation circuits have been required. The knocking effect in the combustion chamber means wave-like vibrations of the gas mixture occuring in the combustion chamber of the internal combustion engine during combustion. These vibrations are caused by an accelerating chemical reaction of the non-burned air/fuel mixture in the end gas region of the combustion chamber and lead to the occurrence of the knocking per time unit. Since a strong thermal loading usually takes place inside the combustion chamber upon the occurrence of knocking and a material wear off can occur, efforts should be made to avoid or substantially reduce the knocking. If knocking occurs for a long period of time this could lead to damaging of the internal combustion engine. Therefore the occurrence of knocking must be discovered in the internal combustion chamber as soon as possible.

SUMMARY OF THE INVENTION

It is an object of the present invention to provide an improved device for detecting pressure fluctuations in a combustion chamber of an internal combustion chamber.

It is another object of this invention to provide a device for detecting pressure fluctuations, by means of which knocks during the fuel combustion in the combustion chamber would be detected soon and by very simple means.

These and other objects of the invention are attained by a device for detecting pressure knocks during a combustion process in a combustion chamber of an internal combustion engine, comprising a first ionic current gage including two measuring electrodes to which a constant voltage is applied and which measure ionic currents produced by combustion of ionized gases in said combustion chamber; and at least one second ionic current gage for receiving an ionic current in the region of a measuring point, said second ionic current gage being spaced from said first ion stream gage in an axial direction at a distance.

The second ionic current gage can detect pressure knocks by known methods in connection with a simple evaluation circuit.

The device according to the invention is easy and inexpensive to manufacture.

The first gage and the second gage may have approximately the same sensitivity.

The first and second gage may be positioned parallel to each other.

Each ionic current gage may have a positive electrode while a housing of said combustion chamber may be a negative electrode for each ionic current gage.

Each gage may be sleeve-shaped.

The first and second gages may have a common housing surrounding said gages, said housing having a chamber which is formed opposite to said second gage, said housing extending in said axial direction up to a measuring tip of said first gage, said chamber having the length equal to said distance, said chamber of said housing having at least one opening extending in said axial direction.

The first and second gages may be positioned in an end gas region of said combustion chamber.

The first and second gages may have a different measuring sensitivity, and the electronic evaluation circuit connected to a respective gage determines a time of running through said distance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
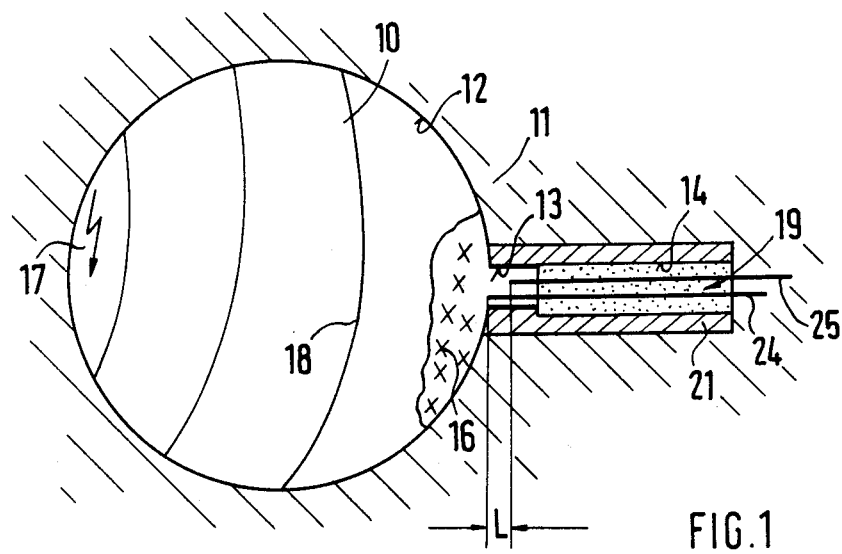
FIG. 1 is a sectional view of a combustion chamber with a double ionic current probe installed therein.

Referring now to the drawings in detail, and firstly to FIG. 1 thereof, a combustion chamber 10 of an internal combustion engine is defined in a cylinder block 11. In a wall 12 of the cylinder block 11 is formed a bore 13 which connects a recess 14 of the cylinder block 11 with the combustion chamber 10. Bore 13 is located in a so-called end gas region 16 of the combustion area generated by an ignition point 17. The flame front of the combustion area is denoted by reference numeral 18. The end gas region 16 is determined experimentally. This is the region in which material wear off occurs on the wall 12 during the knocking combustion.

Figure 2:
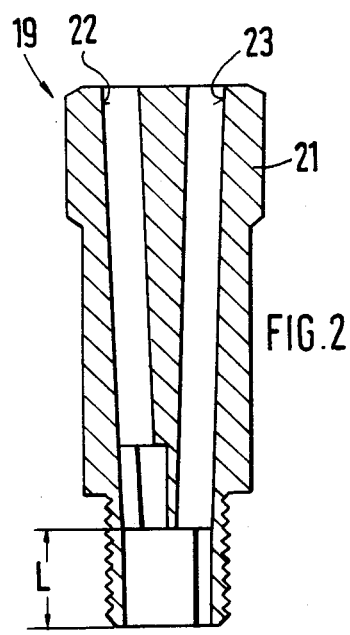
FIG. 2 is a sectional view through the double ionic current probe.

A so-called double ionic current probe or sampling device is positioned in the recess 14. The double ionic current probe is shown in a sectional view in FIG. 2.

The probe includes a housing 21 which is insertable or screwable into the cylinder block. Two axial bores 22 and 23 are formed in the housing 21. Two known, commercially available ionic current probes or gages 24 and 25 are inserted in the bores 22 and 23, respectively. The tips of the ionic current probes, facing the combustion chamber 10, are displaceable relative to each other in the axial direction by a distance L. Ionic current probes of various sensitivity can be also utilized. It is, of course, understood that two equally sensitive ionic current probes can be used for a simple measurement. Both ionic current probes 24 and 25 form a positive electrode which serves as a measuring electrode. This electrode is arranged in cooperation with the wall 12 which forms a negative electrode. Of course such ionic current probes can be used, as will be explained hereinbelow in reference to FIG. 5, which have both positive and negative electrodes. A constant voltage of the same value is applied between the positive and negative electrodes on both ionic current probes 24, 25.

Figure 3:
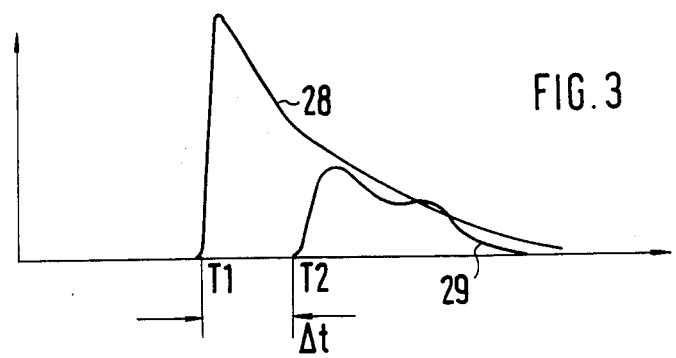
FIG. 3 is a graph illustrating a curve of the ionic current per time unit during a non-knocking combustion.

The principle of measuring and thereby the mode of operation of two ionic current probes are based on various flame speeds in the end gas region 16 during the knocking and non-knocking combustion. As shown in FIG. 3, with the non-knocking combustion, the ionic current 28 between the ionic current probe 24 and the wall 12 is assigned to a point in time $T_1$. The flame front 18 moves further and reaches according to time $\Delta t$ at the point in time $T_2$ the ionic current probe 25 so that an ionic current 29 flows in the ionic current probe 25.

Figure 4:
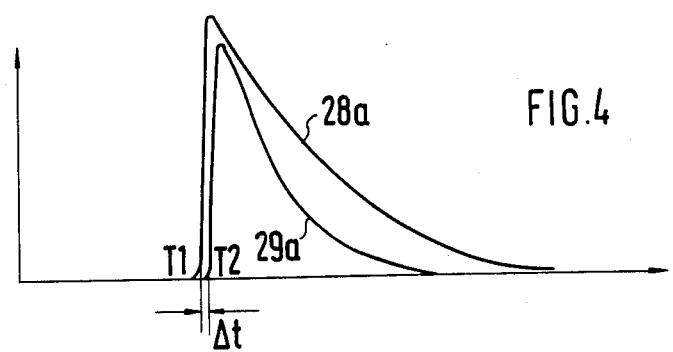
FIG. 4 is a graph illustrating a curve of the ionic current per time unit during the knocking combustion.

As can be seen from FIG. 4, when the knocking combustion takes place, the flame front 18 moves into the end gas region 16 more rapidly than in the case of the non-knocking combustion. As with the non-knocking combustion, the ionic current 28a flows in the ionic current probe 24 again at the point in time $T_1$. The flame front 18 moves during the knocking combustion with a higher speed so that it is seen, per time unit, sooner at the second ionic current probe than the ionic current 29 with the normal combustion. Thereby the time of the non-knocking combustion and the time of the knocking combustion would differ from each other by the coefficient equal to $\Delta t$. This difference in time is so substantial that it can be determined by a simple electronic evaluation circuit. However, for a good and precise evaluation both ionic currents measured by two ionic current probes must have approximately the same gradients during the occurrence of these ionic currents. The curve of the ionic current for the discrimination between the non-knocking and knocking combustion is not necessary. If the ionic current probes with different sensitivities are employed the point in time, at which the ionic current flow is used, is changed. This must be taken into consideration also when an evaluation circuit is selected. In order to be able to distinguish two types of combustion from each other a threshold value is introduced into the electronic evaluation circuit, the exceeding of which is considered as a knocking combustion whereby the combustion course in the combustion chamber is controlled or can be adjusted.

Figure 5:
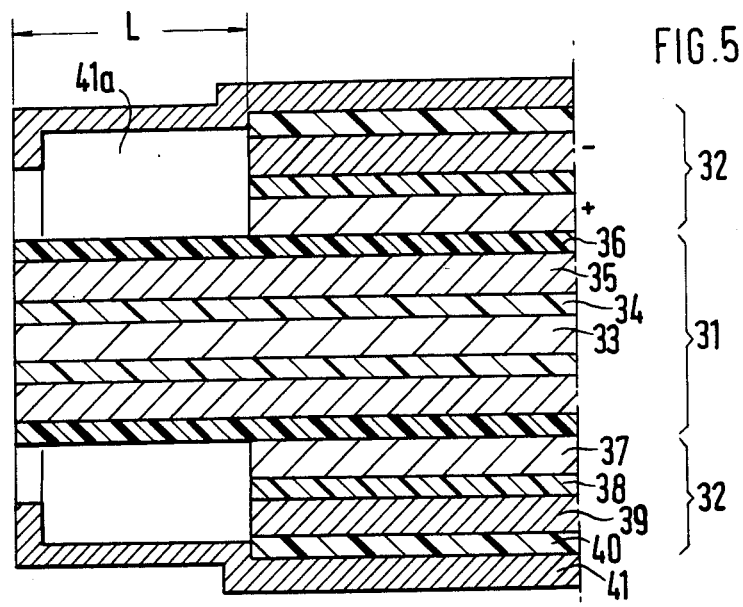
FIG. 5 is a modified embodiment of the double ionic current probe of the invention.

FIG. 5 shows a modified embodiment of the double ionic current probe 19 which includes two ionic current probes 31 and 32 formed as sleeves surrounding one another. An insulating layer 34 is provided on the pin-shaped positive electrode 33. A sleeve-shaped negative electrode 35 of the ionic current probe 31 is mounted on the insulating layer 34. A second insulating layer is laid on the ionic current probe 31. Only the second ionic current probe 32 is displaceable in the axial direction by distance L. Probe 32 is positioned immediately on the insulation layer 36. The second ionic current probe has a sleeve-shaped positive electrode 37, an insulating layer 38, a sleeve-shaped negative electrode 39 and an outer protective layer 40. The latter is surrounded by a housing 41 which is formed so that the flame front 18 can move in the ionic current probes 31 and 32 only in the axial direction. Housing 41 is drawn up to the measuring tip of the ion stream probe 31 and has a chamber 41a. This chamber is connected with a plurality of bores arranged in the axial direction.

Figure 6:
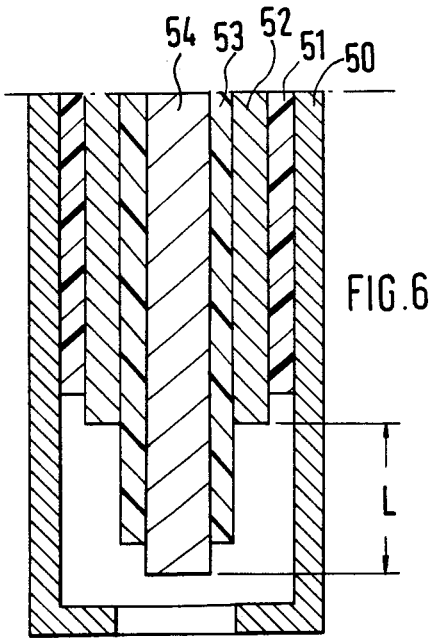
FIG. 6 is yet another modification of the double ionic current probe.

In the embodiment of FIG. 6, a double ionic current probe 19 has a housing 50 which is formed as a negative electrode similarly to the embodiment of FIG. 1. The housing has a sleeve-shaped internal insulating layer 51, an outer positive electrode 52, a second insulating layer 53 and an inner positive electrode 54. Both positive terminals 52, 54 are spaced from each other at an axial distance L.

In all the modifications of the double ionic current probe 19, the axial distance L between two individual ionic current probes is important in order to determine the difference between the flame speeds per time unit of the knocking combustion and non-knocking combustion. It should be also considered that the double ionic current probe 19 be arranged as centrally of the end gas region as possible because only then significantly different flame speeds between the knocking and non-knocking combustions can be determined.

It will be understood that each of the elements described above, or two or more together, may also find a useful application in other types of devices for detecting pressure fluctuations in combustion chambers of internal combustion engines differing from the types described above.

While the invention has been illustrated and described as embodied in a device for detecting pressure fluctuations in a combustion chamber of an interval combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

We claim:

1. A device for detecting pressure knocks during a combustion process in a combustion chamber of a cylinder block of an internal combustion engine, said combustion chamber including an end gas region towards which a flame front of a flame in said combustion chamber moves during combustion with a speed which is different during non-knocking combustion and knocking combustion, said cylinder block being provided with an additional chamber having an axis and formed at said region and connected thereto, said detecting device comprising a first ionic current gage including two measuring electrodes to which a constant voltage is applied and which measure ionic current produced by combustion of ionized gases; at least one second ionic current gage for measuring an ionic current in the region of a measuring point; and an evaluation circuit connected to said first and second gages, said first and second ionic current gages being accommodated in said additional chamber, and said second ionic current gage being offset from said first ionic current gage in an axial direction of said additional chamber at a distance whereby, due to a different speed of said flame front during non-knocking and knocking combustion and said distance, the time interval between which said flame front reaches said first and second gages is shorter during knocking combustion than during non-knocking combustion and different signals indicative of knocking combustion or non-knocking combustion accordingly are received in said evaluation circuit.

2. The device as defined in claim 1, wherein said first gage and said second gage have approximately the same sensitivity.

3. The device as defined in claim 1, wherein each ionic current gage has a positive electrode while a housing of said combustion chamber forms a negative electrode for each ionic current gage.

4. The device as defined in claim 1, wherein said second gage is parallel to said first gage.

5. The device as defined in claim 1, wherein said first and second gages have a different measuring sensitivity.

* * * * *